Figure 1:
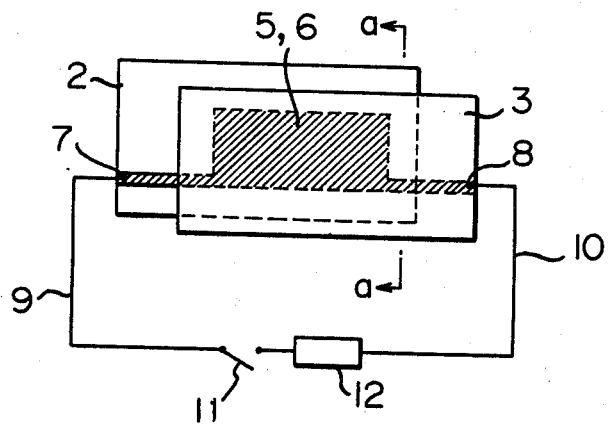

United States Patent [19]

Morinaka et al.

[11] Patent Number: 4,473,486
[45] Date of Patent: Sep. 25, 1984

[54] COMPOSITION FOR LIQUID CRYSTAL COLOR DISPLAY ELEMENTS

[75] Inventors: Ryoichi Morinaka; Ryoichi Tukahara; Tsutomu Nishizawa; Tuneo Hidaka, all of Ohmuta, Japan

[73] Assignee: Mitsui Toatsu Chemicals, Inc., Tokyo, Japan

[21] Appl. No.: 405,267

[22] Filed: Aug. 4, 1982

Related U.S. Application Data

[63] Continuation of Ser. No. 129,315, Mar. 11, 1980, Pat. No. 4,360,447.

[30] Foreign Application Priority Data

Mar. 16, 1979 [JP] Japan .................................. 54-30057
May 25, 1979 [JP] Japan .................................. 54-63996
Jun. 25, 1979 [JP] Japan .................................. 54-79086

[51] Int. Cl.³ ............................ C09K 3/34; G02F 1/13
[52] U.S. Cl. .................................. 252/299.1; 350/349
[58] Field of Search .................. 350/349; 252/299.1

[56] References Cited

U.S. PATENT DOCUMENTS

| | | | |
|---|---|---|---|
| 3,960,751 | 6/1976 | Moriyama et al. | 252/299.1 |
| 4,232,949 | 11/1980 | Huffman | 252/299.1 |
| 4,232,950 | 11/1980 | Benham | 252/299.1 |
| 4,273,929 | 6/1981 | Boller et al. | 252/299.61 |
| 4,304,683 | 12/1981 | Morihaka et al. | 252/299.1 |
| 4,360,447 | 11/1982 | Morimaka et al. | 252/299.1 |
| 4,363,743 | 12/1982 | Moeller et al. | 252/299.1 |
| 4,376,715 | 3/1983 | Cognard et al. | 252/299.1 |
| 4,402,854 | 9/1983 | Moeller et al. | 252/299.1 |
| 4,428,858 | 1/1984 | Cognard et al. | 252/299.1 |

FOREIGN PATENT DOCUMENTS

| | | | |
|---|---|---|---|
| 2104 | 5/1979 | European Pat. Off. | 252/299 |
| 26004 | 4/1981 | European Pat. Off. | 252/299.1 |
| 34832 | 9/1981 | European Pat. Off. | 252/299.1 |
| 2920730 | 11/1979 | Fed. Rep. of Germany | 252/299.1 |
| 3028593 | 2/1981 | Fed. Rep. of Germany | 252/299.1 |
| 3036853 | 4/1981 | Fed. Rep. of Germany | 252/299.1 |
| 3038372 | 5/1981 | Fed. Rep. of Germany | 252/299.1 |
| 54-126059 | 9/1979 | Japan | 252/299.1 |
| 1102 | 2/1979 | Switzerland | 252/299.1 |
| 973262 | 10/1964 | United Kingdom | 252/299.1 |
| 2037803 | 7/1980 | United Kingdom | 252/299.1 |
| 2074182 | 10/1981 | United Kingdom | 252/299.1 |

OTHER PUBLICATIONS

Constant, J., et al., "Photostable Anthraquinone Pleochroic Dyes", presented at 7th Internat'l Liq. Cryst. Conf., Bordeaux, Fr., (Aug. 1978).
Saeva, F., Xerox Disclosure Journal, vol. 1, Nos. 9/10, pp. 61-62, (Sep./Oct. 1976).
Cognard, J., et al., Mol. Cryst. Liq. Cryst., vol. 470, pp. 1-19 (1981).

*Primary Examiner*—Teddy S. Gron
*Attorney, Agent, or Firm*—Fisher, Christen & Sabol

[57] ABSTRACT

A composition for nematic liquid crystal color display elements, said composition comprising at least one anthraquinonic dye represented by the following formula

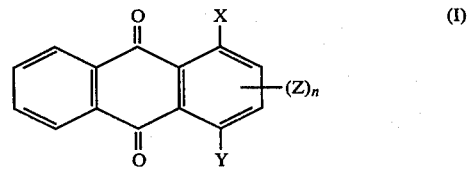

wherein X and Y are identical or different and represent —NH$_2$ or —OH; Z represents halogen, —OR, —NHR,

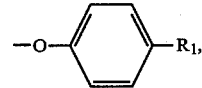

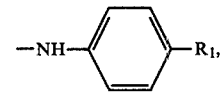

—CONHR$_2$ or —COOR$_2$, in which R represents an alkyl group having 1 to 15 carbon atoms or a lower alkyl group optionally substituted by —OH,

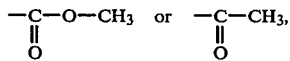

$R_1$ represents hydrogen, halogen, —OH, —OCH$_3$, an alkyl group having 1 to 15 carbon atoms, or a methoxy group optionally substituted by

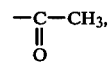

and $R_2$ is a phenyl group, an alkyl group having 2 to 5 carbon atoms or a cyclohexyl group; and n is an integer of 1 or 2 provided that when X is —NH$_2$ and Y is —OH, and when X and Y are both —OH, n is an integer of 1, and when n represents an integer of 2, the two Z's may be identical or different dissolved in at least one nematic liquid crystal.

17 Claims, 2 Drawing Figures

COMPOSITION FOR LIQUID CRYSTAL COLOR DISPLAY ELEMENTS

This is a continuation of application Ser. No. 129,315, filed Mar. 11, 1980, now U.S. Pat. No. 4,360,447.

This invention relates to a composition for liquid crystal color display elements utilizing an electro-optical effect, comprising nematic liquid crystals and a dichoric dye. More specifically, this invention relates to a composition for nematic liquid crystal color display elements used in display devices utilizing the electro-optical effect of nematic liquid crystals, said composition comprising at least one nematic liquid crystal and at least one dichroic anthraquinonic dye dissolved therein, said dye being represented by the following formula

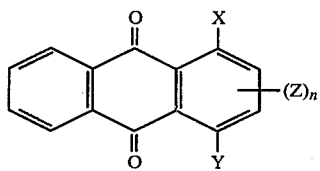

wherein X and Y are identical or different and represent $-NH_2$ or $-OH$; Z represents halogen, $-OR$, $-NHR$,

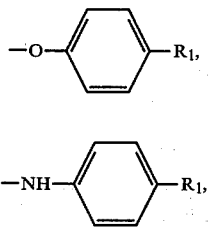

$-CONHR_2$ or $-COOR_2$, in which R represents an alkyl group having 1 to 15 carbon atoms or a lower alkyl group optionally substituted by $-OH$,

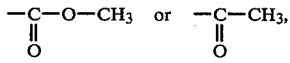

$R_1$ represents hydrogen, halogen, $-OH$, $-OCH_3$, an alkyl group having 1 to 15 carbon atoms, or a methoxy group optionally substituted by

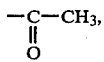

and $R_2$ is a phenyl group, an alkyl group having 2 to 5 carbon atoms or a cyclohexyl group; and n is an integer of 1 or 2 provided that when X is $-NH_2$ and Y is $-OH$, and when X and Y are both $-OH$, n is an integer of 1, and when n represents an integer of 2, the two Z's may be identical or different, preferably at least one dichroic anthraquinonic dye of the formula

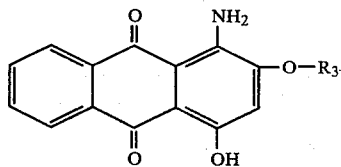

wherein $R_3$ represents a linear or branched alkyl group having 2 to 15 carbon atoms.

Liquid crystal display devices containing dichroic dyes having already been known as "guest-host" mode display devices in the field of liquid crystal technology, and are utilized as display devices in watches, portable electronics calculators, televisions, etc.

The theory of this type of display device is that dichroic dye molecules are aligned according to the alignment of the molecules of a liquid crystalline material. Specifically, the liquid crystal molecules change from an "off" state to an "on" state are are oriented upon the application of an external stimulation which is normally an electric field, and incident to this, dichroic dye molecules are simultaneously oriented. As a result, the degrees of absorption of light by the dye molecules in the two states change to achieve a color display.

Such an electro-optical effect means a liquid crystal color display utilizing the so-called guest-host effect. The guest-host mode is presently operated by a method which involves the use of nematic liquid crystals having positive or negative dielectric anisotropy and a method which involves the use of liquid crystals that show phase transition from a cholesteric phase to a nematic phase upon the application of an electric field.

Some dichroic dyes which operate in accordance with this theory have been known heretofore, but none of them have proved to be entirely satisfactory in their performance in commercial applications. This has partly hampered the development and commercialization of liquid crystal color display devices based on this theory.

Dichroic dyes used in liquid crystal color display devices based on this theory must meet certain basic requirements. For example, the are generally required to have a sufficient coloring ability in small amounts, a high dichroic ratio that enables them to show a high contrast by application of voltage or absence of voltage, sufficient solubility in liquid crystals, excellent durability and high stability additionally, they should not deteriorate the performance of the device even when used for a long period of time.

The present invention provides anthraquinomic dyes of formula (I) or (II) as dichroic dyes which meet these requirements.

Typical examples of these dichoric anthraquinonic dyes are shown in Tables 1 and 2 below.

TABLE 1

| Dye No. | Structural formula | Color in chloroform solution |
|---|---|---|
| 1 | ![structure] | Red |

TABLE 1-continued

| Dye No. | Structural formula | Color in chloroform solution |
|---|---|---|
| 2 | 1-NH₂, 2-O-C₆H₄-C₈H₁₇(t), 4-OH anthraquinone | Red |
| 3 | 1-NH₂, 2-O-C₆H₄-C₉H₁₉(n), 4-OH anthraquinone | Red |
| 4 | 1-NH₂, 2-O-C₆H₄-C₁₂H₂₅(n), 4-OH anthraquinone | Red |
| 5 | 1-NH₂, 2-O-C₆H₄-Br, 4-OH anthraquinone | Red |
| 6 | 1-NH₂, 2-NH-C₆H₅, 4-OH anthraquinone | Reddish violet |
| 7 | 1-NH₂, 2-NH-C₆H₄-C₄H₇(n), 4-OH anthraquinone | Reddish violet |
| 8 | 1-NH₂, 2-NH-C₈H₁₇(n), 4-OH anthraquinone | Reddish violet |
| 9 | 1-NH₂, 2-NHC₁₂H₂₅(n), 4-OH anthraquinone | Reddish violet |
| 10 | 1-NH₂, 2-OCH₃, 4-NH₂ anthraquinone | Violet |
| 11 | 1-NH₂, 2-O-C₆H₅, 4-NH₂ anthraquinone | Violet |
| 12 | 1-NH₂, 2-O-C₆H₄-C₅H₁₁(n), 4-NH₂ anthraquinone | Violet |
| 13 | 1-OH, 2-O-C₆H₅, 4-OH anthraquinone | Orange yellow |
| 14 | 1-OH, 2-O-C₆H₄-Cl, 4-OH anthraquinone | Orange yellow |
| 15 | 1-OH, 2-O-C₆H₄-C₃H₇(n), 4-OH anthraquinone | Orange yellow |
| 16 | 1-OH, 2-O-C₆H₄-C₈H₁₇(t), 4-OH anthraquinone | Orange yellow |
| 17 | 1-OH, 2-O-C₆H₄-C₉H₁₇(n), 4-OH anthraquinone | Orange yellow |
| 18 | 1-NH₂, 2-O-(CH₂)₇CH₃, 4-OH anthraquinone | Red |
| 19 | 1-NH₂, 2-O-(CH₂)₃CH₃, 4-OH anthraquinone | Red |
| 20 | 1-NH₂, 2-O-(CH₂)₆CH₃, 4-OH anthraquinone | Red |
| 21 | 1-NH₂, 2-O-CH₂C(CH₃)₂CH₂CH(CH₃)₂, 4-OH anthraquinone | Red |
| 22 | 1-NH₂, 2-O-(CH₂)₈CH₃, 4-OH anthraquinone | Red |
| 23 | 1-NH₂, 2-O-(CH₂)₁₁CH₃, 4-OH anthraquinone | Red |

TABLE 1-continued
| Dye No. | Structural formula | Color in chloroform solution |
|---|---|---|
| 24 | 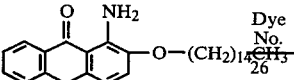 | Red |
| 25 | 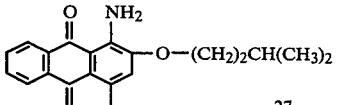 | |
TABLE 2
| Dye No. | Structural formula | Absence of electric field | Upon application of electric field |
|---|---|---|---|
| 26 | 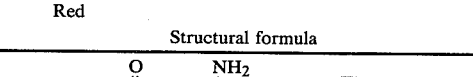 | Red | Colorless |
| 27 | 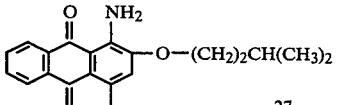 | Red | Colorless |
| 28 | 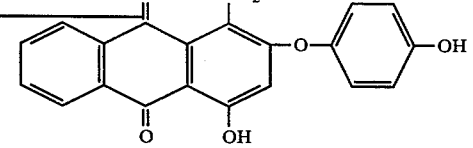 | Red | Colorless |
| 29 | 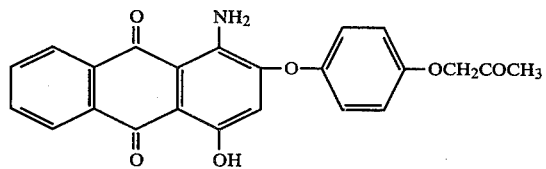 | Red | Colorless |
| 30 | 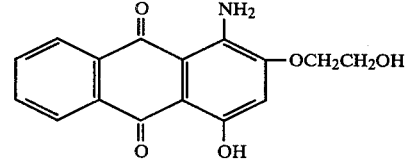 | Red | Colorless |
| 31 | 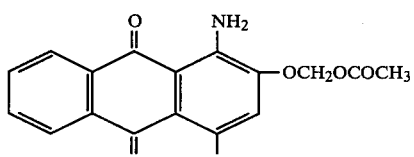 | Violet | Colorless |
| 32 | 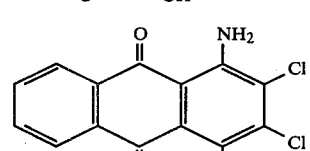 | Bluish violet | Colorless |

TABLE 2-continued

| Dye No. | Structural formula | Change in color by alignment | |
|---|---|---|---|
| | | Absence of electric field | Upon application of electric field |
| 33 | 1,4-diamino-2,3-bis(4-methoxyphenoxy)anthraquinone | Bluish violet | Colorless |
| 34 | 1,4-diamino-2-(N-phenylcarbamoyl)anthraquinone (—CONH—C$_6$H$_5$) | Blue | Colorless |
| 35 | 1,4-diamino-2-(N-butylcarbamoyl)anthraquinone (—CONHC$_4$H$_9$) | Blue | Colorless |
| 36 | 1,4-diamino-2-(ethoxycarbonyl)anthraquinone (—COOC$_2$H$_5$) | Blue | Colorless |
| 37 | 1,4-diamino-2-(propoxycarbonyl)anthraquinone (—COOC$_3$H$_7$) | Blue | Colorless |
| 38 | 1,4-diamino-2-(cyclohexyloxycarbonyl)anthraquinone (—COO—C$_6$H$_{11}$) | Blue | Colorless |

The dichroic dyes in accordance with this invention can be synthesized from known materials in accordance with known reactions. Since the resulting crude dyes frequently contain inorganic salts and other impurities, they have to be purified by extraction or recrystallization with organic solvents, preferably by thin-layer chromatography or column chromatography.

The following Synthetic Examples show the preparation of typical dichroic dyes in accordance with this invention.

SYNTHETIC EXAMPLE 1

Synthesis of a compound identified as Dye No. 1 in Table 1

Potassium hydroxide (2.5 g) was added to 30 g of phenol, and dissolved at 100° C. Then, 9 g of 1-amino-2-bromo-4-hydroxyanthraquinone was added and reacted at 160° C. for 4 hours. The resulting mixture was cooled, and a dilute aqueous solution of sodium hydroxide was added. The mixture was stirred, and filtered. The filtration cake was washed with water and dried to afford 8.0 g of a crude dye. Recrystallization from ethanol afforded a compound identified as Dye No. 1 in Table 1. This product was a red dye which showed a maximum absorption at a wavelength of 515 mμ.

Compounds identified as Dyes Nos. 2 to 7 in Table 1 can be similarly synthesized by using the corresponding phenols or anilines instead of the phenol in the above procedure.

SYNTHETIC EXAMPLE 2

Synthesis of compounds identified as Dyes Nos. 13 to 17 in Table 1

Compounds identified as Dyes Nos. 13 to 17 were synthesized in the same way as in Synthetic Example 1 except that 2-bromo-1,4-dihydroxyanthraquinone was used instead of 1-amino-2-bromo-4-hydroxyanthraquinone and reacted with the corresponding phenols.

SYNTHETIC EXAMPLE 3

Synthesis of a compound identified as Dye No. 8 in Table 1

The captioned compound can be synthesized by operating in the same way as in Synthetic Example 1 using n-octylamine instead of the phenol. It can, however, be advantageously synthesized by the following procedure.

Five grams of the compound identified as Dye No. 5 in Table 1 was reacted with 15 g of n-octylamine at 150° C. for 2 hours. Steam was introduced into the reaction solution to remove the excess of unreacted amine by distillation. The precipitate was separated by filtration, washed with water, and dried to afford 5.5 g of a crude dye. The crude dye was purified by chromatographing it on a column packed with a silica gel powder using chloroform as a developing agent. Thus, a compound identified as Dye No. 8 was obtained. This product was a reddish violet dye which showed a maximum absorption in a chloroform solution at a wavelength of 519 mμ.

A compound identified as Dye No. 9 in Table 1 can be similarly synthesized by using n-dodecylamine instead of n-octylamine.

SYNTHETIC EXAMPLE 4

Synthesis of a compound identified as Dye No. 10 in Table 1

Ten grams of sodium 1-amino-4-(p-toluenesulfonylamide)-anthraquinone-2-sulfonate was added to a solution of 21 g of potassium hydroxide in 45 g of methanol. The mixture was stirred at 80° C. for 2 hours. Water was added, and the precipitate was separated by filtration, washed with water and dried. Five grams of the methoxylated product so obtained was stirred in 50 g of conc. sulfuric acid at 40° C. for 1 hour, and then discharged onto ice water. The precipitate was separated by filtration, washed with water, and dried to afford 4.4 g of a crude dye. Recrystallization from ethanol afforded a compound (Dye No. 10) as dark violet pillar-like crystals. This product was a violet dye which showed a maximum absorption in a chloroform solution at a wavelength of 529 mμ.

Compounds identified as Dyes Nos. 11 and 12 in Table 1 can be synthesized similarly to the above procedure using phenols instead of methanol. Advantageously, however, these compounds can be synthesized by operating in the same way as in Synthetic Example 1 except that 1,4-diamino-2-bromoanthraquinone is used instead of 1-amino-2-bromo-4-hydroxyanthraquinone and reacted with the corresponding phenols.

SYNTHETIC EXAMPLE 5

Synthesis of a compound identified as Dye No. 18 in Table 1

5.0 g of 1-amino-4-hydroxy-2-phenoxyanthraquinone, 20 g of octyl alcohol and 1.2 g of potassium carbonate were reacted at 150° C. for 30 hours in a stream of nitrogen. The reaction mixture was cooled, and 50 g of methanol was added. The precipitate was filtered. The filtration cake was washed with methanol and water, and dried to afford 3.5 g of a crude product. The crude product was chromatographed on a column of silica gel using benzene as an eluent. Thus, 0.4 g of 1-amino-4-hydroxy-2-octoxyanthraquinone (Dye No. 18) was obtained. This product was a red dye which had a melting point of 130° to 132° C. and showed a maximum absorption in chloroform at a wavelength of 513 mμ and 550 mμ.

Other dichroic dyes which may be used in this invention can be synthesized substantially in accordance with the above Synthetic Examples.

The present invention is further described with reference to the drawings.

Figure 2:
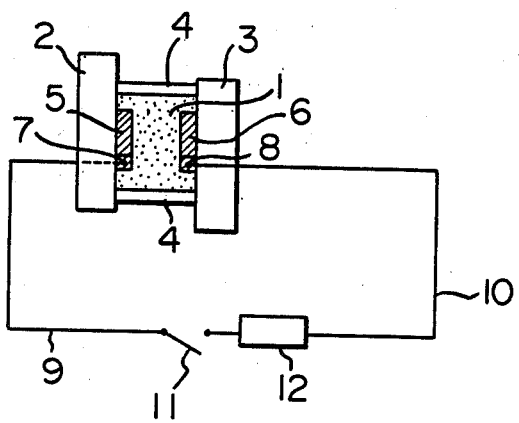

FIG. 1 is a front elevation of a liquid crystal display device incorporating the composition of this invention; and FIG. 2 is a cross-sectional view taken along the line a—a of FIG. 1.

Referring to the drawings, a nematic liquid crystalline substance colored with a dye is filled in a layer 1 interposed between two parallel-laid glass slides 2 and 3. The glass slides 2 and 3 are spaced from each other by spacers 4 defining both side ends of the layer 1. The slides 2 and 3 respectively have on their inner surfaces transparent electrodes 5 and 6. The electrode 5 is connected to an external lead wire 9 through a contact 7. Likewise, the electrode 6 is connected to an exterior lead wire 10 through a contact 8. The electrodes 5 and 6 are of rectangular shape and are disposed face-to-face to each other. A voltage source 12 and a switch 11 connected thereto in series are connected between the exterior lead wires 9 and 10. The voltage source 12 supplies a dc voltage or an ac voltage of low frequency sufficient to re-orient the liquid crystal molecules and dichroic dye molecules in the layer 1 and align them on the inner surfaces of the slides 2 and 3. Usually, voltages of 10 to 20 V are sufficient.

An example of the nematic liquid crystal used in this invention is a mixture composed of 43% of 4-cyano-4'-n-pentyl biphenyl, 17% of 4-cyano-4'-n-propoxy biphenyl, 13% of 4-cyano-4'-n-pentoxy biphenyl, 17% of 4-cyano-4'-n-octoxy biphenyl, and 10% of 4-cyano-4'-n-pentyl terphenyl. There can also be used a so-called chiral nematic liquid crystal mixture obtained by adding 5% of cholesteryl nonanoate, 3% of optically active 4-cyano-4'-isopentyl biphenyl, etc. to the aforesaid mixture. This chiral nematic liquid crystal mixture is in the cholesteric phase in the absence of electric voltage, but phase transition to the nematic phase occurs upon the application of voltage. The above examples are not limitative, and other liquid crystalline compounds which have a nematic liquid crystalline phase showing positive or negative dielectric anisotropy can be used either singly or as mixtures in this invention.

The dichroic dyes in accordance with this invention are used either singly or as mixtures. The concentration of the dichroic dye in the liquid crystalline substance is such that the dye dissolves in the liquid crystals, and the dye molecules can be fully oriented and aligned by the orientation of the liquid crystal molecules. Generally, the suitable concentration of the dye is 0.01 to 20% by weight, preferably 0.01 to 3% by weight, based on the liquid crystalline substance. It is also possible to obtain the desired color hue by mixing the dichroic dye in accordance with this invention with another dichroic or non-dichroic dye or colorant.

In the making of such a liquid crystal display device, transparent electrodes are treated in advance so that the liquid crystal molecules and the dichroic dye molecules may be oriented parallel or perpendicular to the surfaces of transparent electrodes. The treatment can be performed, for example, by a method comprising simply rubbing the surfaces of the transparent electrodes with a cotton cloth, etc. in a fixed direction, a method comprising coating a silane-type compound, a method comprising vapor deposition of silicone oxide, or a method comprising coating a silane-type compound or depositing a vapor of silicone oxide, and then rubbing the surfaces of the transparent electrodes with a cotton cloth, etc. in a fixed direction.

When a solution consisting of nematic liquid crystals having positive dielectric anisotropy and the dichroic dye in accordance with this invention is filled in a liquid crystal color display device which has been treated so that the liquid crystals and dye molecules may be oriented parallel to the surfaces of transparent electrodes, the display device is of the type wherein the color of the electrode portions disappears upon the application of voltage.

When a solution consisting of nematic liquid crystals having negative dielectric anisotropy and the dichroic dye in accordance with this invention is filled in a liquid color display device which has been treated so that the liquid crystal and dye molecules may be oriented perpendicular to the surfaces of transparent electrodes, the display device is of the type wherein the electrode portions are colored upon the application of voltage.

The display devices shown in FIGS. 1 and 2 are of the type which permits viewing of transmitted light. These devices may become reflective-type display devices if the glass slide 2 is replaced by a non-transparent reflecting plate, or by placing a reflective plate rearwardly of the slide 2 to permit viewing from ahead of the glass slide 3.

There are a diversity of liquid crystals and methods available in making liquid crystal color display devices using the dichroic dyes in accordance with this invention. Essentially, all of them can be classified as displaying methods based on a guest-host mode utilizing the electro-optical effect of nematic liquid crystals.

The following typical Examples illustrate the present invention specifically. The invention, however, is not limited to these Examples. All percentages in these Examples are by weight.

EXAMPLE 1

In a display device of the type shown in FIGS. 1 and 2, Silicone KF-99 (a trademark of Shin-etsu Chemical Co., Ltd. for a silicone compound) was coated on the surfaces of transparent electrodes 5 and 6. The layer 1 of this display element was filled with a colored liquid crystal solution composed of 0.1 part by weight of Dye No. 1 shown in Table 1 and 9.9 parts by weight of a liquid crystal mixture consisting of 38% of 4-cyano-4'-n-pentyl biphenyl, 8% of 4-cyano-4'-n-pentoxy biphenyl, 23% of 4-cyano-4'-n-heptyl biphenyl, 8% of 4-cyano-4'-n-heptoxy biphenyl, 10% of 4-cyano-4'-n-octoxy biphenyl, 10% of 4-cyano-4'-pentyl terphenyl and 3% of optically active 4-cyano-4'-isopentyl biphenyl. A plastic film having a thickness of 10 μm was used as spacer 4.

When the switch 11 was opened, this display device was seen to be colored distinctly red. When the switch 11 was closed and an ac voltage of 20 V at 60 Hz was applied, that portion of the device at which the transparent electrodes 5 and 6 faced each other became almost colorless. When the switch 11 was opened, the device again showed a red colored state. When the display device was placed in the light path of a spectrophotometer, the maximum absorption wavelength was 524 mμ. When the switch 11 was opened and closed at this wavelength, the ratio of absorbance was 1:6 showing good dichroism.

When this display device was subjected to irradiation of visible light having a wavelength of more than 400 mμ for a long period of time, no change was noted in color hue, the ratio of absorbance, etc., and the display device retained the same properties as it had immediately after construction.

EXAMPLE 2

When Dye No. 8 shown in Table 1 was used instead of the dye used in Example 1, a display of violet color and colorlessness was obtained by the opening and closing of the switch 11.

EXAMPLE 3

When Dye No. 15 shown in Table 1 was used instead of the dye in Example 1, a display of orange yellow color end colorlessness was obtained by the opening and closing of the switch 11.

EXAMPLE 4

When Dye No. 22 shown in Table 1 was used instead of the dye in Example 1, a display of red color and colorlessness was obtained by the opening and closing of the switch 11.

What we claim is:

1. A composition for nematic liquid crystal color display elements, said composition comprising at least one nematic liquid crystal and at least one anthraquinonic dye represented by the following formula

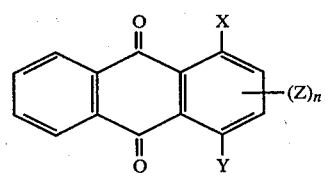

wherein X and Y are identical or different and represent —$NH_2$ or —OH; Z is bonded to the 2-position and/or 3-position relative to X and represents

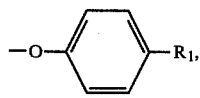

in which $R_1$ represents, halogen, —OH, —OCH$_3$, an alkyl group having 1 to 15 carbon atoms, or a methoxy group optionally substituted by

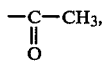

and n is an integer of 1 or 2 provided that when X is —NH$_2$ and Y is —OH, and when X and Y are both —OH, n is an integer of 1, and when n represents an integer of 2, the two Z's may be identical or different, or one may be the group defined above and the other may be a halogen, said anthraquinonic dye being dissolved in the nematic liquid crystal.

2. A composition as claimed in claim 1 wherein $R_1$ represents an alkyl group having 3 to 12 carbon atoms, and n is an integer of 1 or 2 provided that when X is —NH$_2$ and Y is —OH, and when X and Y are both —OH, n is an integer of 1, and when n represents an integer of 2, the two Z's may be identical or different.

3. A composition as claimed in claim 2 wherein $R_1$ represents an alkyl group having 4 to 10 carbon atoms.

4. A composition as claimed in claim 1 wherein a mixture of said anthraquinonic dyes is dissolved in at least one nematic liquid crystal.

5. A composition as claimed in claim 1 wherein a mixture of said anthraquinonic dyes is dissolved in a mixture of nematic liquid crystals.

6. A composition as claimed in claim 1 wherein the concentration of said anthraquinonic dye is 0.01 to 20 percent by weight based upon the weight of the nematic liquid crystal.

7. A composition as claimed in claim 1 wherein said concentration is 0.01 to 3 percent by weight based on the weight of the nematic liquid crystal.

8. A composition as claimed in claim 1 wherein said nematic liquid crystal has a positive dielectric anisotropy.

9. A composition as claimed in claim 1 wherein said nematic liquid crystal has a negative dielectric anisotropy.

10. A composition as claimed in claim 2 wherein X and Y are each —NH$_2$.

11. A composition as claimed in claim 3 wherein X and Y are —NH$_2$.

12. A composition as claimed in claim 4 wherein X and Y are each —NH$_2$.

13. A composition as claimed in claim 2 wherein X and Y are each —OH.

14. A composition as claimed in claim 3 wherein X and Y are each —OH.

15. A composition as claimed in claim 4 wherein X and Y are each —OH.

16. A composition as claimed in claim 3 wherein n is 1.

17. A composition as claimed in claim 3 wherein said alkyl group has 8 carbon atoms.

* * * * *